United States Patent
Brown

(10) Patent No.: US 6,922,286 B2
(45) Date of Patent: Jul. 26, 2005

(54) OFF-AXIS DIFFRACTIVE BEAM SHAPERS AND SPLITTERS FOR REDUCING SENSITIVITY TO MANUFACTURING TOLERANCES

(75) Inventor: David Renick Brown, Meridianville, AL (US)

(73) Assignee: Mems Optical, Inc., Huntsville, AL (US)

( * ) Notice: Subject to any disclaimer, the term of this patent is extended or adjusted under 35 U.S.C. 154(b) by 0 days.

(21) Appl. No.: 10/826,371

(22) Filed: Apr. 19, 2004

(65) Prior Publication Data

US 2004/0201894 A1 Oct. 14, 2004

Related U.S. Application Data

(62) Division of application No. 09/594,711, filed on Jun. 16, 2000, now Pat. No. 6,731,432.

(51) Int. Cl.[7] .......................... G02B 27/44; G02B 5/18
(52) U.S. Cl. ......................... 359/566; 359/15; 359/571
(58) Field of Search ............................ 359/15, 16, 565, 359/566, 569, 571, 575, 562

(56) References Cited

U.S. PATENT DOCUMENTS

| | | | |
|---|---|---|---|
| 4,322,162 A | 3/1982 | McKelvie et al. | |
| 4,677,629 A | 6/1987 | Lesh | |
| 5,264,957 A | 11/1993 | Melamed et al. | |
| 5,369,511 A | 11/1994 | Amos | |
| 5,422,746 A | * 6/1995 | Aharoni et al. | 359/16 |
| 5,615,022 A | 3/1997 | Brandstetter et al. | |
| 5,864,381 A | 1/1999 | Neal et al. | |
| 5,986,996 A | 11/1999 | Kitamura et al. | |
| 6,064,057 A | * 5/2000 | Shimomura et al. | 250/226 |

FOREIGN PATENT DOCUMENTS

| | | |
|---|---|---|
| DE | 19822453 | 12/1999 |
| EP | 946894 | 9/2000 |
| JP | 52146648 | 12/1977 |
| JP | 60076705 | 5/1985 |
| JP | 10282450 | 10/1998 |

OTHER PUBLICATIONS

Case et al., "Multifacet holographic optical elements for wave front transformations", Applied Optics, vol. 20, No. 15, (Aug. 1 1981), pp. 2670–2675.*

* cited by examiner

Primary Examiner—Mark A. Robinson
Assistant Examiner—Alessandro Amari
(74) Attorney, Agent, or Firm—Olds, Maier & Richardson, PLLC

(57) ABSTRACT

A diffractive element used in conjunction with a grating to move a desired order beam off-axis, thereby reducing interference by undesired orders. Use of the off-axis grating allows a more uniform beam in the presence of manufacturing defects, such as etch depth errors. The diffractive element used with the off-axis grating may include a beam shaper, a one-dimensional beam splitter, or a two-dimensional beam splitter.

11 Claims, 9 Drawing Sheets

OFF-AXIS DIFFRACTIVE BEAM SHAPERS AND SPLITTERS FOR REDUCING SENSITIVITY TO MANUFACTURING TOLERANCES

FIELD OF THE INVENTION

This application is a divisional of Application No. 09/594,711, filed on 16 Jun. 2000, now U.S. Pat. No. 6,731,432, the entire contents of which are hereby incorporated by reference and for which priority is claimed under 35 U.S.C. § 120.

DESCRIPTION OF THE RELATED ART

As used herein, a "beam shaper" is an optical element used to alter the shape or energy distribution within a beam of light. Thus, a beam shaper may alter magnification of a light beam, the footprint of the beam when projected on a surface, the energy distribution within a beam, or some combination thereof. An example of altering the energy distribution of a beam is transforming a Gaussian light distribution to a uniform light distribution. Beam shapers may be alternately and interchangeably referred to as "beam transformers." Also as used herein, "beam splitter" refers to an optical element which divides a beam of light into two or more separate beams having similar characteristics.

FIG. 1 shows a conventional on-axis beam shaping assembly. An input beam 10, which has a Gaussian energy distribution, is transmitted by the diffractive beam shaper 11. The resultant shaped beam 12, which has a uniform energy distribution, strikes beam corrector 13 located a distance d from the beam shaper 11 along the optical axis of the input beam 10. The diffractive beam corrector 13 corrects a phase shift in the shaped beam 12 caused by the beam shaper 11. The beam shaping assembly shown is termed "on-axis," because the output beam 14 is located on the axis of the input beam 10. If the phase correction function was not desired, the assembly shown could consist of the beam shaper 11 alone.

Manufacturing tolerances can affect the output quality of beam shapers, such as that shown in FIG. 1, to a great degree. For example, for diffractive optics which are formed by dry etching, the etching processes are not exact, and the final optical shape may deviate slightly from the "desired" or "perfect" shape designed by an optical designer and sought to be etched. Such manufacturing errors or tolerances also occur with other methods of forming diffractive optics.

FIG. 2 shows the simulated output of an on-axis beam shaper, which is designed to produce a uniform beam, with various amounts of etch depth error. For the 'perfect' optic case 20 (i.e., where the designed shape is simulated with no fabrication or etch error), the peak to valley non-uniformity in the intensity of output beam is 2%. For the 0.5% etch depth error case 21, the peak to valley non-uniformity in the intensity of output beam increases to 10%. For the 3.0% etch depth error case 22, the peak to valley non-uniformity in the intensity of output beam increases to 46%. A typical etch depth tolerance to achieve a high yield in a conventional dry etching process is ±3.0%, which produces the 46% non-uniformity shown in plot 22. For many applications of beam transformers, such as lithography or holography, the desired uniformity of the beam is ±3.0%, which corresponds to a lower etch error than 3%, and hence cannot be attained with such a conventional high yield process.

It should be noted that the magnitude of the beam non-uniformity is a function of the magnification of the beam shaper. If the beam shaper produces a uniform beam that is much smaller than the input beam, for example one eighth, the additional non-uniformity caused by a 3.0% etch error can be as small as 2.0%. However, the effects of the 3% etching error quickly increase to 19% for a beam reduced to only one fourth size.

The non-uniformity observed in the output beams 21 and 22 in FIG. 2 is the result of the undesired orders produced by the diffractive interfering with the desired order of the output beam. Even though the energy in these orders may only be a few percent of the total input energy, they can have a profound affect on the uniformity of the beam, as illustrated in FIG. 2. The underlying problem is that all of the orders of an on-axis diffractive system are co-located symmetrically about the optical axis. Since a beam which is transformed in this manner is coherent, these co-located multiple order beams interfere and cause the non-uniformity shown in FIG. 2.

On-axis diffractive beam splitters, such as that shown in FIGS. 3a and 3b, suffer from similar problems of interference by undesired diffractive orders. Such an on-axis diffractive beam splitter may have an extremely tight tolerance for the etch depth of the diffractive, hence reducing the yield and making the cost of such a device impractical.

FIGS. 3a and 3b show perspective and side views, respectively, of an on-axis diffractive beam splitter that creates five beams. An input light beam 30 strikes a diffractive beam splitter 31, which is designed to split the input beam 30 into a 0th order beam 32 and four diffracted-order beams 33. The diffractive beam splitter shown is termed "on-axis," because the output beams 32 and 33 are located along a line which intersects the axis of the input beam 30. FIG. 3c shows the five beams in their one-dimensional, on-axis arrangement For the "perfect" optic case (not plotted), the peak to valley non-uniformity in the intensity of output beams 32 and 33 is 6% and the efficiency of the beam splitter is 92%. For the 3.0% etch depth error case, the peak-to-valley non-uniformity in the intensity of output beams is 26% and the efficiency is 91%. A typical etch depth tolerance to achieve a high yield in a conventional dry etching process is ±3.0%, which produces the 26% non-uniformity. This non-uniformity among split beams is caused by the co-location of the diffracted beams and the 0th order beam along a line. For many applications of beam splitters, such as communications and hole drilling or marking, the desired non-uniformity among the beams is less than ±5.0%, which corresponds to a lower etch error than 3%, and hence cannot be attained with such a conventional high yield process.

It is accordingly apparent that conventional on-axis diffractive beam shapers and splitters have extremely tight tolerances for the etch depth of the diffractive. Such tolerances lower the manufacturing yield, and thus make the cost of such devices impractical. Further, diffractive optics are wavelength sensitive, and the conventional on-axis configurations can only be used at the wavelength for which they are designed.

SUMMARY OF THE INVENTION

An object of the invention is to provide a diffractive optical element which substantially obviates one or more problems or limitations of conventional on-axis diffractive optical elements.

Another object of the invention is to design a diffractive beam splitter and/or diffractive beam shaper which is less sensitive to manufacturing errors and wavelength than conventional elements.

By designing a beam shaper or beam splitter that is off-axis by a defined minimum amount to separate the desired order(s) of the diffractive from the order(s) sensitive to manufacturing tolerances, the manufacturing difficulty of achieving the otherwise necessary tight tolerance in the etch depth needed for a very uniform beam may be eliminated. This off-axis configuration also allows a diffractive beam shaper or beam splitter to work over a large wave band.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

To achieve the objects and in accordance with the purpose of the invention, as embodied and broadly described herein, there is provided an off-axis beam shaper for producing an output beam of a desired order with a desired energy distribution, including an optical substrate; and a diffractive surface formed on the optical substrate to perform both a beam shaping function on an input beam and to spatially separate the output beam of the desired order from all other diffracted beams of different orders, thereby avoiding interference between the output beam and any other diffracted beam of a different order.

In another aspect, the invention includes an off-axis beam splitter for producing a plurality of substantially identical output beams, including an optical substrate; and a diffractive surface formed on the optical substrate to split an input beam into the plurality of substantially identical output beams and to translate the plurality of output beams away from an optical axis of the input beam.

Another aspect of the invention includes a method of shaping an input beam with diffractive optics, including diffracting an input beam to have a desired shape and energy distribution at a predetermined distance from the optic; and spatially separating an output beam having a desired order from other diffracted beams of different orders at the predetermined distance.

Still another aspect of the invention includes a method for producing a plurality of substantially identical and uniform output light beams, including splitting an input beam into the plurality of substantially identical output beams; and translating the plurality of output beams away from an optical axis of the input beam.

It is to be understood that both the foregoing general description and the following detailed description are exemplary and explanatory only and are not restrictive of the invention, as claimed.

The accompanying drawings, which are incorporated in and constitute a part of this specification, illustrate several embodiments of the invention and, together with the description, serve to explain the principles of the invention.

BRIEF DESCRIPTION OF DRAWINGS

Reference to the accompanying Figures provides further understanding by those skilled in the art of the numerous objects and advantages of the present invention, in which.

DESCRIPTION OF THE PREFERRED EMBODIMENTS

Reference will now be made in detail to the present exemplary embodiments of the invention, examples of which are illustrated in the accompanying drawings. Wherever possible, the same reference numbers will be used throughout the drawings to refer to the same or like parts.

In one embodiment of this invention, a blazed grating function is superimposed onto a beam shaping function (or beam transforming function) to create an off-axis beam shaper (or beam transformer). In other words, in addition to performing its desired beam shaping function, the off-axis beam shaper according to the present invention also includes a diffractive function which deflects a desired diffractive order or orders relative to the optical axis of the input beam, thereby creating separation from at least the 0th order transmitted beam.

Various techniques for designing diffractive gratings to perform desired optical functions are well known in the grating art. After learning of the optical functions according to the invention described herein, those skilled in the art will appreciate various methods of designing gratings to performed the disclosed functions. One diffractive grating design method is the so-called Gerchberg-Saxpon method, which is an interative algorithm where beam shapes and intensities are defined at input and output planes. The phase of the input and output beams is allowed to vary, until the algorithm converges to a diffractive grating design which will produce the defined beam at the output plane from the input beam. In such a manner, off-axis diffractive beam shapers and splitters according to the present invention may be designed. Those skilled in the art will appreciate that there are other methods for designing beam shapers and beam splitters with the characteristics described herein.

Figure 4:
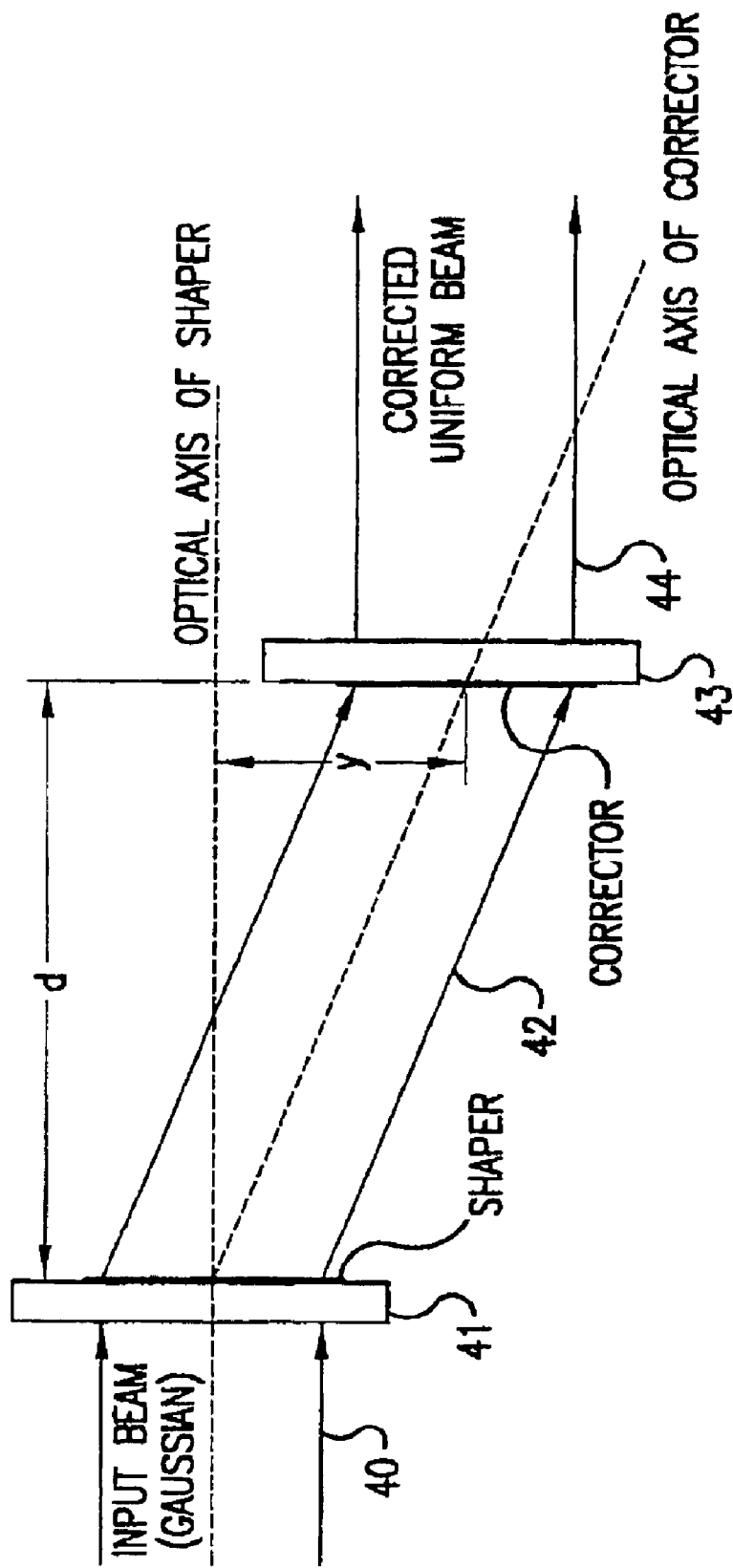
FIG. 4 is a side view of an illustrative off-axis beam shaper design.

FIG. 4 shows an illustrative off-axis beam shaping configuration. An input beam 40 having a Gaussian energy distribution enters a beam shaper 41. This beam shaper 41, in addition to performing a diffractive shaping function, also includes a diffractive grating to spatially separate a desired order of the transmitted light beam. The period of such grating should be small enough to separate the diffractive orders at the plane of the beam corrector 43 a distance d away from the shaper 41. The desired diffracted order beam 42 having a uniform energy distribution is moved off-axis from the input beam 40's optical axis, along which the undesired orders (e.g., 0th, 2nd, etc.) are transmitted. The corrector 43 produces a phase-corrected beam 44 from the off-axis desired order beam 42. Note that the phase corrector 43 also includes an off-axis diffractive grating to change the direction of the off-axis desired order beam 42 to the corrected output beam 44. The center of the output beam 44 is shifted a distance y from the center of the on-axis beams (e.g., 0th order).

Though the phase corrector 43 is shown in FIG. 4, there are some beam shaper applications which do not require a uniform phase beam (e.g., a cutting laser), and in those uses, the corrector 43 need not be present. However, the corrector 43 collimates the off-axis beam 42, and is useful if the corrected output beam 44 needs to propagate over some distance. Also, the phase corrector 43 need not cause the output beam 44 to be off-axis relative to its input beam 42, instead transmitting the off-axis beam 42 along its optical axis. The design shown in FIG. 4 does have an advantage over such an alternate corrector configuration, because in FIG. 4, the output beam 44 does not contain the corrector's 0th order effects. Though the corrector 43 would not introduce as much beam non-uniformity in its 0th order as the shaper 41 in its 0th order, to obtain as uniform an output beam 44 as possible, it is desirable that the beam 44 contain neither undesired order (e.g., 0th) beams from the shaper 41, nor undesired order (e.g., 0th) beams from the phase corrector 43.

A preferred embodiment of this invention is that the diffractive surface of the shaper 41 be on the inner surface of the element (i.e., facing the corrector 43), and the diffractive surface of the corrector 43 be on the on the inner surface of the element (i.e., facing the shaper 43), as shown in FIG. 4. Two main reasons for this preference are that the diffractive surfaces are more easily protected from the environment, and that the tolerances for the thickness of the substrates are looser than in other configurations. That is, as long as the facing diffractive surfaces are the distance d apart, the optical substrates on which they are formed may vary in thickness.

Figure 5A:
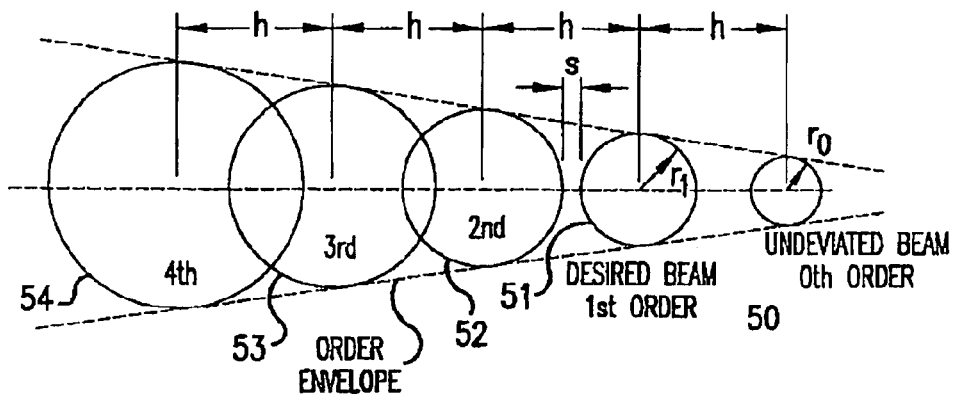
FIGS. 5a and 5b show two limiting cases of the separation of orders for diffractive beam shapers.
Figure 5B:
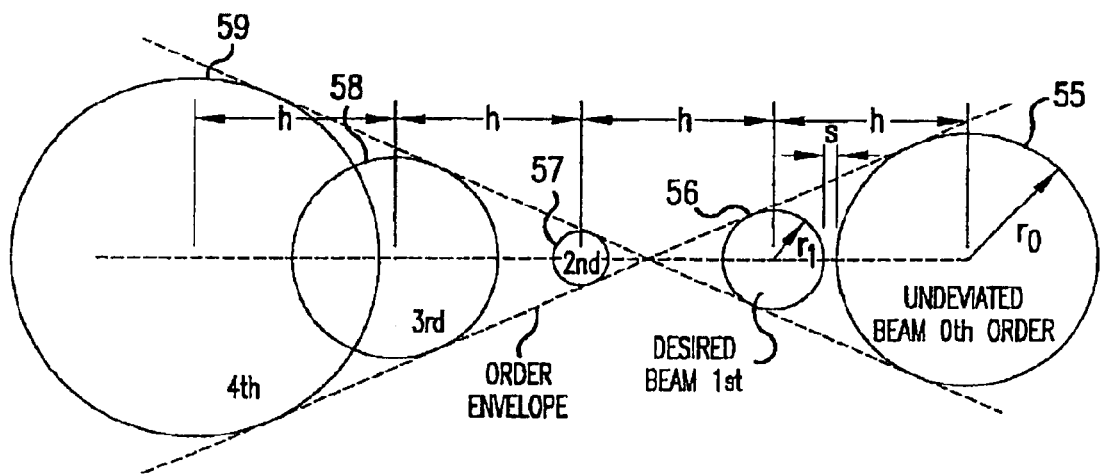

FIGS. 5a and 5b show two limiting cases of the separation of orders for defective beam shapers. In each of the examples shown, the 0th through 4th order beams have a constant distance h between their respective centers. FIG. 5a shows the limiting case where the desired 1st order beam is larger than the 0th order beam, and closer to the 2nd order beam. FIG. 5b shows the limiting case where the desired 1st order beam is smaller than, and closer to, the 0th order beam. Notice that the higher order beams follow asymptotes defined by the magnification of the beam shaper. A key parameter is the minimum separation between centers of the orders, denoted as variable h.

FIG. 5a shows 0th to 4th order diffracted beams 50–54, whose centers are separated by a distance h. Beam 51 is the desired, 1st order beam. From FIG. 5a, and in particular from the linear equation of the asymptotes, it may be observed that $$h > 3r_1 - r_0 + s = r_2 + r_1 + s \quad [1]$$

where $r_2$ is the radius of the 2nd order, $r_1$ is the radius of the 1st (desired) order, $r_0$ is the radius of the 0th order, and s is some minimal acceptable separation of the 1st and 2nd orders. This minimal separation s depends of the shape of the desired beam. If the desired beam has a small "roll-off" (i.e., width from the outermost full intensity part of a beam to the perimeter of the beam where the intensity drops substantially to zero) at its edges, the separation s will be small. If the roll-off of the beam is large, s will also be large. In general, s should be about twice the width of the roll-off of the desired beam.

FIG. 5b shows 0th to 4th order diffracted beams 55–59, whose centers are separated by a distance h. Beam 56 is the desired, 1st order beam. From FIG. 5b a it may be observed that $$h > r_0 + r_1 + s \quad [2]$$

where $r_0$ is the radius of the 0th order (undeviated) beam, and s is greater than the sum of the widths of the roll-off of the 0th and 1st order. Notice that s may be different in equations 1 and 2. To summarize equations 1 and 2, $$h > \left\{ \begin{array}{l} 3r_1 - r_0 + s \\ r_0 + r_1 + s \end{array} \right\}_{max} \quad [3]$$

Once h has been determined, the maximum period of the diffraction grating superimposed on the beam shaper may be determined from a normal incidence grating equation $$\sin(\theta_m) = \frac{m\lambda}{\Lambda} \quad [4]$$

where $\theta_m$ is the angle from the normal incidence direction of the mth order diffracted beam, $\lambda$ is the wavelength, and $\Lambda$ is the period of the grating. If the shaped beam occurs a distance d from the shaping optic then the following relation obtained from any of equation 4 holds.

$$\Lambda \leq \frac{m\lambda\sqrt{d^2 + h^2}}{h} \quad [5]$$

It should be noted that the period of the grating of the corrector 43 will be different from the period $\Lambda$ in equation 5; namely it will be $n\Lambda$, where n is the index of refraction of the corrector 43.

Figure 6:
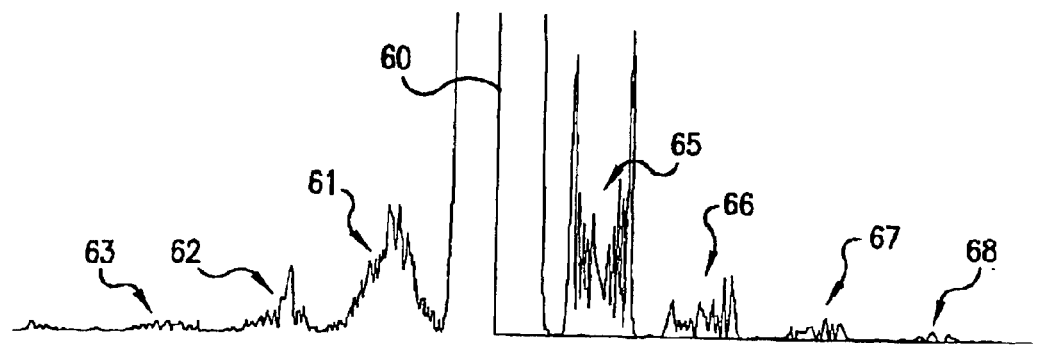
FIG. 6 shows the result of a beam intensity simulation where the radii of the 0th and 1st order beams are equal.

FIG. 6 shows the result of a beam intensity simulation where $r_0 = r_1$. Beam intensity is plotted verses distance, and the plot is centered on the 1st order desired beam 60. Shown is the result of a 5% etch error for an off-axis design. The desired 1st order beam 60 is shown separated from the undesired 0th to −2nd order beams 61–63 and from the undesired 0th to −2nd order beams 61–63. The non-uniformity of the 'perfect' optic as simulated (but not shown) is 4%. The non-uniformity of the off-axis 1st order beam 60 is 12%. Some of this non-uniformity is thought to be due to simulation error cause by lack of guard band for the higher diffractive orders.

Figure 7:
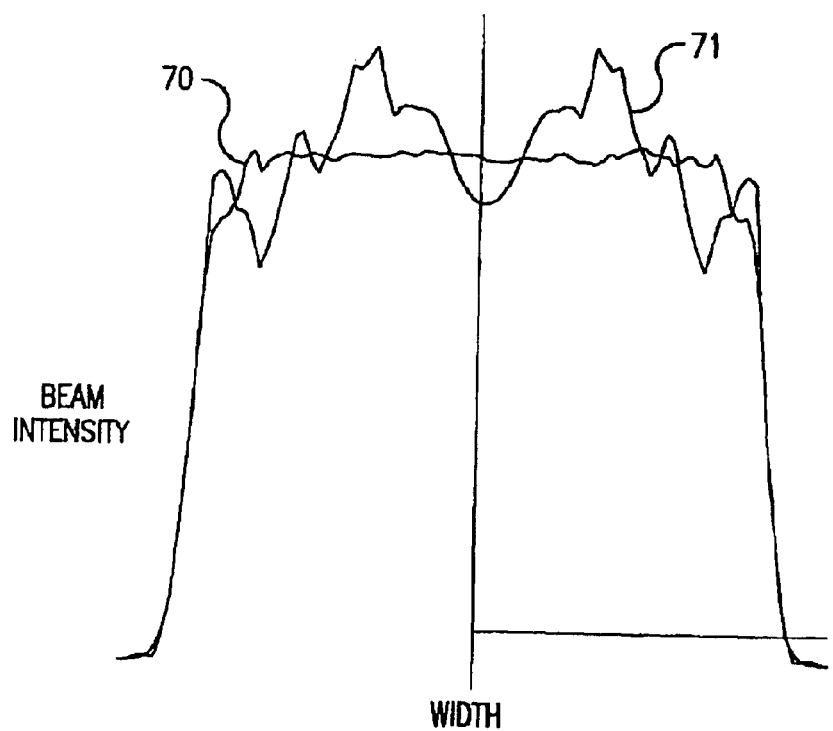
FIG. 7 shows beam intensities of a conventional on-axis design compared with an off-axis design provided in accordance with the teachings of the present application.

FIG. 7 shows beam intensities for on-axis and off-axis designs superimposed. Plot 70 shows the uniformity of an off-axis beam of the desired order. Plot 71 shows the relative non-uniformity of an on-axis beam of a conventional design. The beam 71 from the on-axis design has a non-uniformity of 36%. As noted above, the non-uniformity of the off-axis beam 70 is only 12%, for the same amount of etch error.

Figure 8:
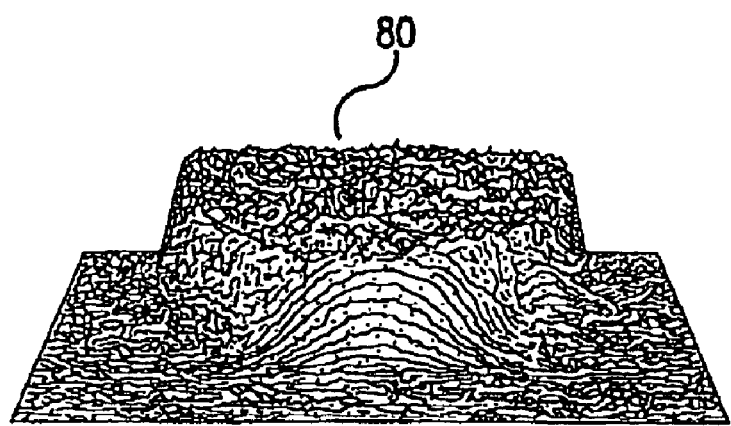
FIG. 8 is a plot of measured beam intensity from an off-axis beam shaper.

Shown in FIG. 8 is a measured result 80 of the beam intensity of the desired order for an off-axis beam shaper. As may be seen, the beam exhibits uniform behavior over its width.

Another useful feature of his invention is that the beam shaper will also shape a broader band of wavelengths than a conventional shaper. Even a wavelength that is 30% different from the design wavelength will be shaped with good uniformity, because changing the wavelength tends to produce the same errors as the wrong etch depth. There are two differences when using a different wavelength. The distance d from the shaping optic where the shaped beam occurs is modified as $$d' = d\frac{\lambda}{\lambda'} \qquad [6]$$

where d' and λ' are the new distance and wavelength, respectively, and λ is the originally-designed wavelength. The second effect is that the efficiency of the device will decrease, as is a well known characteristic of diffractive optics.

Figure 9A:
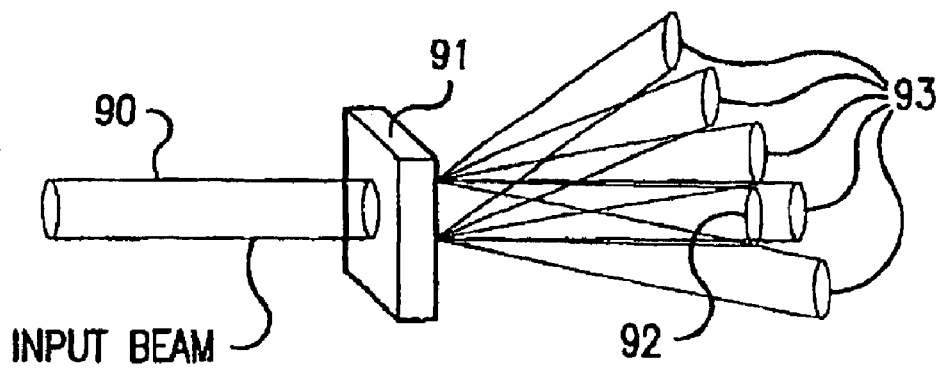
FIG. 9a is a perspective view of a one-dimensional off-axis beam splitter according to the present invention.

A one dimensional, off-axis beam splitter according to another embodiment of the invention is shown in FIG. 9a. As used herein, a "one-dimensional" beam splitter produces two or more output beams which, when projected on a planar surface, lie along a line. Similarly, a "two-dimensional" beam splitter produces a number of beams which, when projected on a planar surface, form a two-dimensional array or other pattern. An input beam 90 enters the off-axis beam splitter 91, which causes the beam to split into 5 diffracted beams 93 which lie in a one-dimensional line laterally separated from the optical axis of the input beam 91. These five diffracted beams are the desired order beams. In addition, the splitter 91 also causes the beam 92 having an undesired order (e.g., 0th order) to be projected along the optical axis of the input beam 91 (i.e., on-axis).

Figure 1:
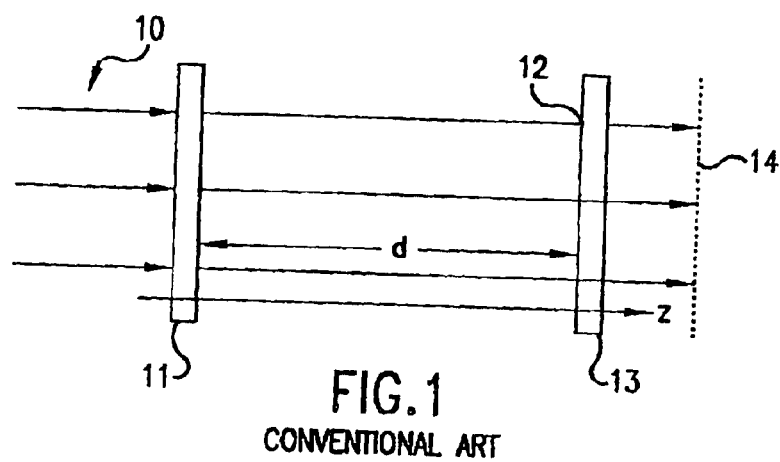
FIG. 1 is a side view of a conventional on-axis beam shaper.
Figure 2:
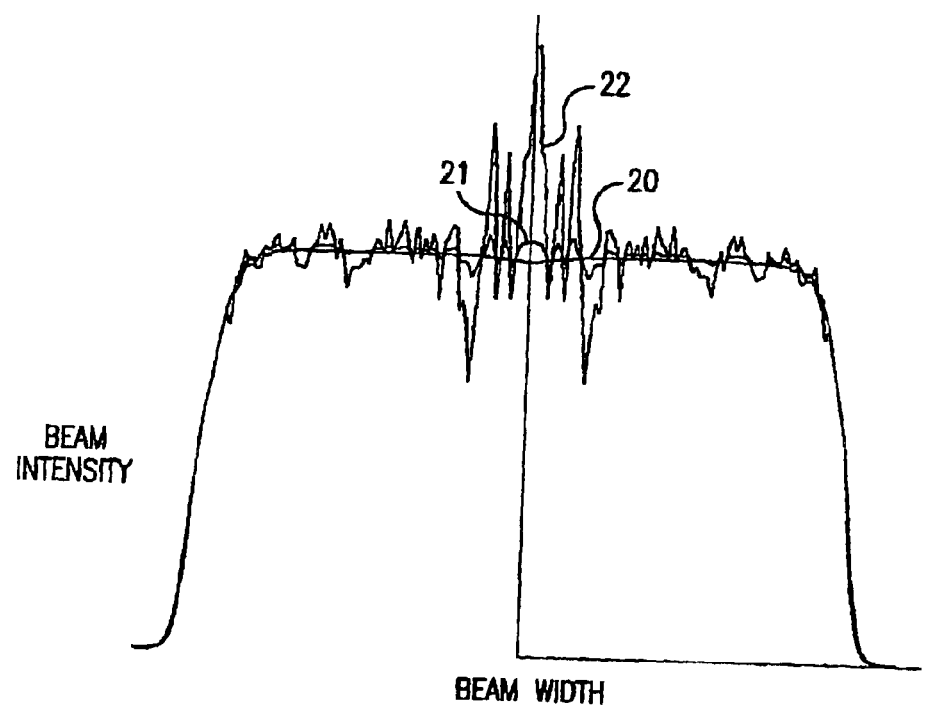
FIG. 2 shows the simulated output of the conventional on-axis beam shaper of FIG. 1 with various amounts of etch depth error.
Figure 3A:
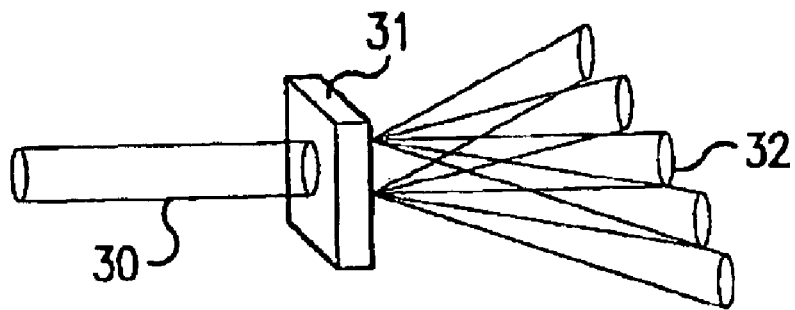
FIGS. 3a and 3b show perspective and side views, respectively, of a conventional style on-axis diffractive beam splitter that creates five beams.
Figure 3B:
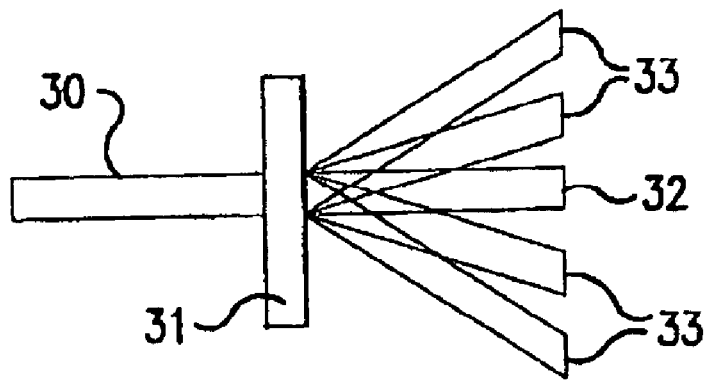
Figure 3C:
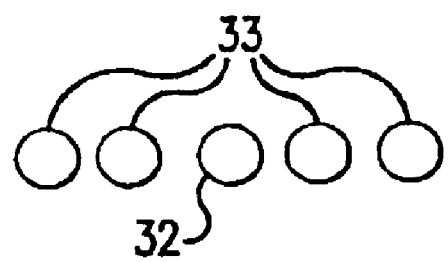
FIG. 3c shows the five beams created by the splitter of FIGS. 3a and 3b in their one-dimensional, on-axis arrangement.

The beam splitter 91 is designed such that the desired order beams 93 are far enough away form the undesired order beam 92 so that fabrication errors do not significantly effect the uniformity of the beams 93. In the above-described beam splitter case, uniformity among the plurality of split beams is desired. The non-uniformity primarily occurs in the 0th order beam, and occurs in a line which intersects the 0th order beam 92 and is parallel to the desired beams 93. Thus, to remove this non-uniformity, the desired beams must be separated a distance from the 0th order beam 92. Simulating the same fabrication errors (i.e., 3.0% etch depth error) as described above for FIGS. 3a and 3b, the non-uniformity of the desired order beam 92 is 5.6% and the efficiency of the splitter 91 is 89%. The slight drop in efficiency, relative to the 91% efficiency of the splitter in FIGS. 3a and 3b, is due to the fact that the 0th order energy causing the uniformity problem for the on-axis case is no longer part of the signal beams. Hence, the overall signal energy is lower.

Figure 9B:
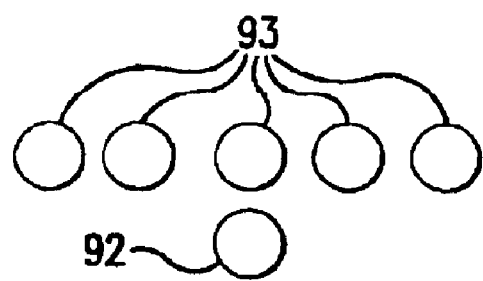
FIG. 9b shows the six beams in created by the splitter of FIG. 9a in their off-axis arrangement.

For the one dimensional case as in FIGS. 9a and 9b, it is only necessary to bend the desired order beams one order out of plane (i.e., off of the optical axis). For the two dimensional case, to achieve equivalent uniformity, the desired order beam(s) will have to be displaced off of the optical axis by a larger amount.

Figure 10:
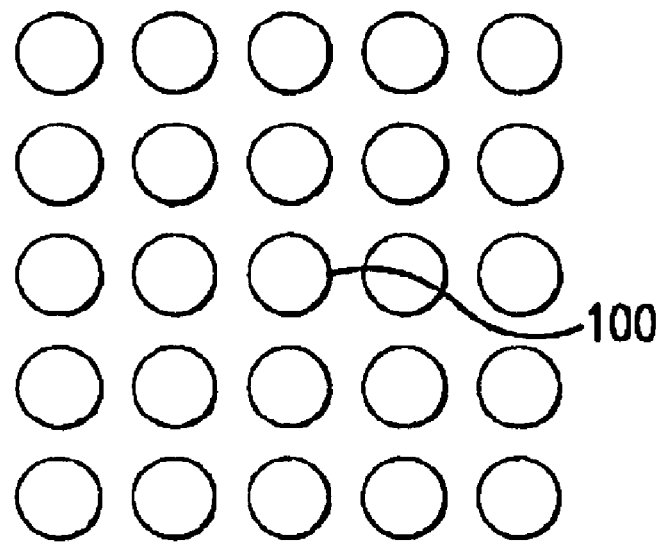
FIG. 10 shows a 5 by 5 grid of beams produced by a two-dimensional beam splitter, with the zero order beam in the center.
Figure 11:
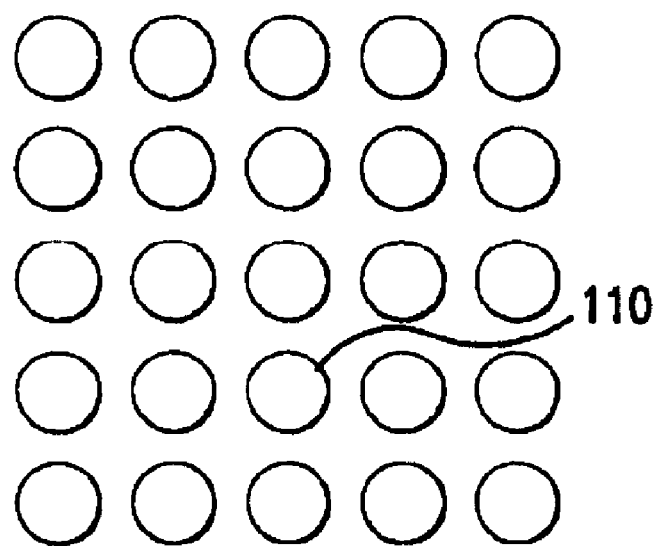
FIG. 11 shows a 5 by 5 grid of beams produced by a two-dimensional beam splitter shifted by one order.

As an example, a beam splitter (not shown) that produces a 5 by 5 grid of signal beams, as shown in FIG. 10, was simulated. Beam 100 is the 0th order beam. For a "perfect" splitter, the simulated efficiency is 90% and the non-uniformity among the split beams is ±1.7%. Simulating the same fabrication errors as before (i.e., 3.0% etch depth error), the efficiency of the splitter becomes 89% and the non-uniformity among the split beams becomes 47%. Moving the grid of split beams up one order relative to the zero order as shown in FIG. 11 reduces the non-uniformity among the beams to 22%. Moving the grid 120 up seven orders relative to the zero order 122 as shown in FIG. 12 reduces the non-uniformity among beams to 4.5% with an efficiency of 86%.

Figure 12:
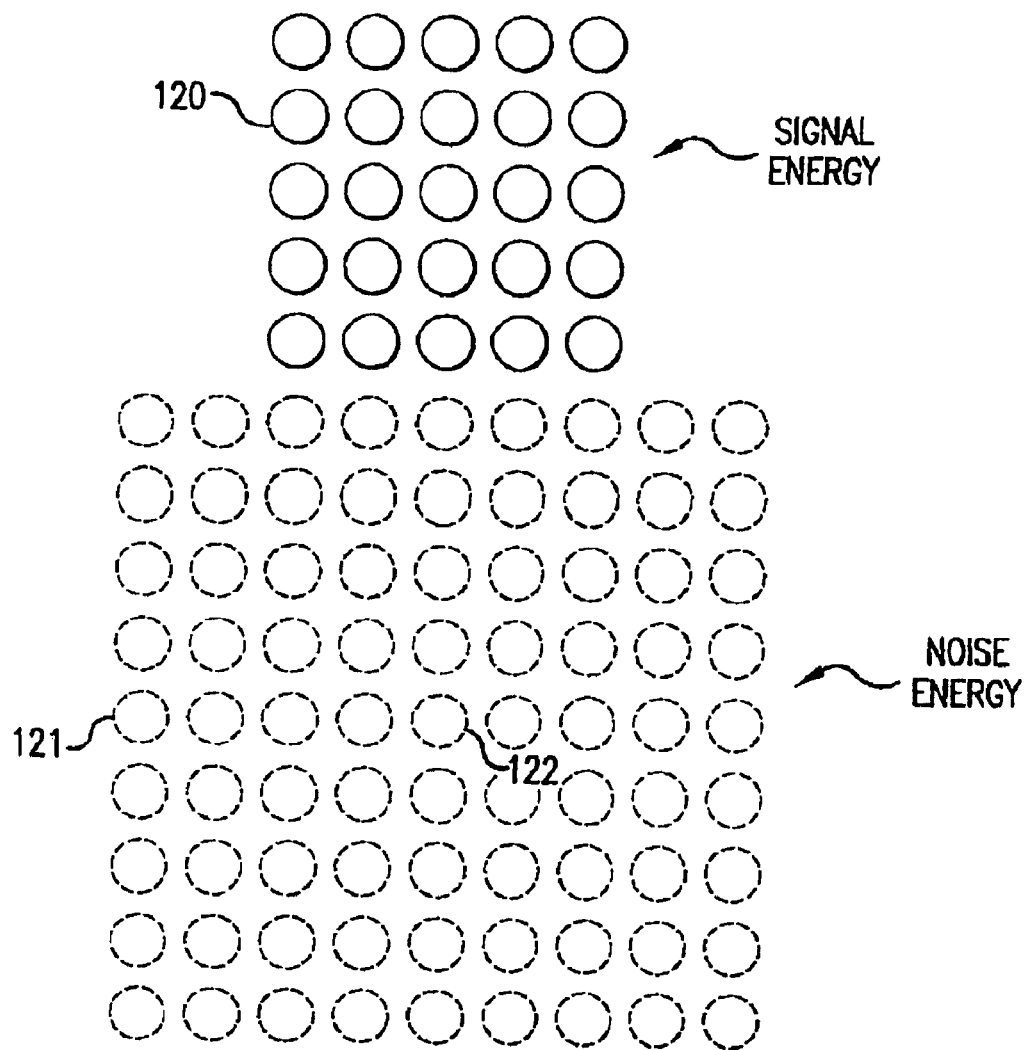
FIG. 12 shows a 5 by 5 grid of beams produced by a two-dimensional beam splitter shifted by seven orders.

The reason that the pattern of beams in FIGS. 11 and 12 needs to be displaced by more orders than in the one-dimensional case is that the manufacturing errors affect the orders that are roughly in the same grid area as the desired orders. In the one-dimensional case, the diffracted energy was only along a single line in the horizontal direction. Thus, the added fabrication errors only affect the orders along that same line. By moving the desired orders off that line (i.e., to the line above the original one), the noise energy causing the non-uniformity is no longer co-located with the signal orders. In the two dimensional case, signal energy is being diffracted in both dimensions, so now there is no longer a single dimension in which one can move the desired orders to avoid the co-location of the noise energy. However, the noise energy that is caused by fabrication errors is generally restricted to an area that is slightly larger than the original desired beams. In the two-dimensional example of FIG. 12 where the size of the desired beam grid was 5 by 5, the noise energy due to fabrication error is located in a 9 by 9 grid, 121. Thus, by moving the split beams 120 up by seven orders, the noise energy 121 and the signal energy are no longer co-located. The size of the noise energy grid 121 can vary from design to design, and according to the type and number of fabrication errors present.

It will be apparent to those skilled in the art that various modifications and variations can be made in the off-axis diffractive elements of the present invention without departing from the scope or spirit of the invention. For example, the invention is not limited to beam transforming, shaping, or splitting. Nor is it limited to optical elements and systems in which a uniform output beam is desired. Rather, the techniques disclosed herein may be used for any application were a diffractive optical element is used, and where the interference of unwanted orders causes a degradation in results. Further, it is possible to design the off-axis grating function of the diffractive element so that the desired order is some order other than the 1st order, such as the 2nd, 3rd, etc.

Further, the invention is not limited to the optical configurations shown in FIGS. 4 and 9a. For example, the diffractive surfaces for the beam shaper and beam corrector may be on either side of a single substrate. Also, a reflective beam splitter, beam shaper and/or reflective corrector may be designed, where the side of the substrate opposite the diffractive surface is reflective. Further, a beam shaper and a corrector, for example, may be formed on the same side of the substrate in separate locations, and the other side of the substrate be reflective providing an optical path between these elements. The present invention is also applicable to a beam diffuser, which splits an input light beam into a large number of diffuse beams combining to have an overall shape and energy distribution.

Finally, the present invention is not limited to light of any particular wavelength or range of wavelengths (e.g., visible light), but rather applies to all wavelengths of radiation for which diffractive elements arc available.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. An off-axis beam shaper, comprising:
   an optical substrate; and
   a diffractive surface, wherein the diffractive surface is formed on the optical substrate, wherein the diffractive surface shapes an input beam so that an output beam of a desired diffractive order has a more uniform energy distribution than the input beam and is spatially separated from all other diffracted beams of different orders, wherein the spatial separation avoids interference between the output beam and and any other diffracted beam of a different order.

2. The beam shaper of claim 1, wherein the beam shaping function includes changing an energy distribution of the input beam from Gaussian to uniform.

3. The beam shaper of claim 1, further comprising: a beam corrector located a distance from the beam shaper to correct a phase of the output beam.

4. The beam shaper of claim 3, wherein the beam corrector changes a direction of the output beam.

5. The beam shaper of claim 1, wherein the diffractive surface deflects the output beam at an acute angle to an optical axis of the input beam.

6. The beam shaper of claim 1, wherein the desired order is 1st order.

7. A method of shaping an input beam with diffractive optics, comprising:
   diffracting an input beam, wherein the input beam is diffracted into a plurality of diffracted beams of various orders;
   shaping the input beam, wherein an output beam of a desired order has a desired shape and energy distribution more uniform than the input beam at a predetermined distance from the optic; and
   spatially separating the output beam from other diffracted beams of different orders at the predetermined distance, where the output beam does not interfere with the other diffracted beams.

8. The method of claim 7, wherein the diffracting step includes changing an energy distribution of the input beam from Gaussian to uniform.

9. The method of claim 7, further comprising: correcting a phase of the output beam.

10. The method of claim 9, wherein the correcting step includes changing a direction of the output beam.

11. The method of claim 7, wherein the spatially separating step includes deflecting the output beam at an acute angle to an optical axis of the input beam.

* * * * *